(12) United States Patent
Wang (10) Patent No.: US 8,954,622 B1
(45) Date of Patent: Feb. 10, 2015

(54) EMBEDDED PROGRAMMABLE LOGIC FOR LOGIC STACKING ON APPLICATION PROCESSOR

(75) Inventor: Yongjiang Wang, Austin, TX (US)

(73) Assignee: Marvell International Ltd., Hamilton (BM)

( * ) Notice: Subject to any disclaimer, the term of this patent is extended or adjusted under 35 U.S.C. 154(b) by 252 days.

(21) Appl. No.: 13/351,763

(22) Filed: Jan. 17, 2012

Related U.S. Application Data

(60) Provisional application No. 61/434,303, filed on Jan. 19, 2011.

(51) Int. Cl.
*G06F 3/00* (2006.01)
*G06F 13/12* (2006.01)
*G06F 13/38* (2006.01)

(52) U.S. Cl.
USPC ............. 710/14; 710/10; 710/18; 710/63; 710/64

(58) Field of Classification Search
USPC ................................. 710/14, 10, 18, 63, 64
See application file for complete search history.

(56) References Cited

U.S. PATENT DOCUMENTS

| | | | |
|---|---|---|---|
| 4,841,450 A | 6/1989 | Fredriksson | |
| 4,887,262 A | 12/1989 | van Veldhuizen | |
| 5,323,385 A | 6/1994 | Jurewicz et al. | |
| 5,383,116 A | 1/1995 | Lennartsson | |
| 5,444,626 A | 8/1995 | Schenk | |
| 5,448,180 A | 9/1995 | Kienzler et al. | |
| 5,448,561 A | 9/1995 | Kaiser et al. | |
| 5,452,201 A | 9/1995 | Pieronek et al. | |
| 5,469,150 A | 11/1995 | Sitte | |
| 5,502,818 A | 3/1996 | Lamberg | |
| 5,539,778 A | 7/1996 | Kienzler et al. | |
| 5,551,053 A | 8/1996 | Nadolski et al. | |
| 5,574,848 A | 11/1996 | Thomson | |
| 5,596,437 A | 1/1997 | Heins | |
| 5,600,782 A | 2/1997 | Thomson | |
| 5,617,282 A | 4/1997 | Rall et al. | |
| 6,151,298 A | 11/2000 | Bernhardsson et al. | |
| 6,735,636 B1 * | 5/2004 | Mokryn et al. | 710/5 |
| 7,957,777 B1 * | 6/2011 | Vu et al. | 455/574 |
| 8,578,076 B2 * | 11/2013 | van der Linden et al. | 710/72 |
| 2008/0046616 A1 * | 2/2008 | Verzunov et al. | 710/68 |
| 2010/0132803 A1 * | 6/2010 | Fima | 137/79 |
| 2010/0211700 A1 * | 8/2010 | de Cesare et al. | 710/14 |
| 2011/0225348 A1 * | 9/2011 | Tom | 711/103 |
| 2011/0307633 A1 * | 12/2011 | Maietta | 710/18 |
| 2012/0191991 A1 * | 7/2012 | Lim et al. | 713/300 |

* cited by examiner

*Primary Examiner* — Idriss N Alrobaye
*Assistant Examiner* — Getente A Yimer (57) ABSTRACT

A system includes a programmable interface module located on an integrated circuit (IC), the programmable interface module configured to be programmed to operate in a plurality of modes, and communicate with at least one device external to the IC based on a selected one of the plurality of modes. Each of the plurality of modes corresponds to at least one of a type of peripheral feature, a type of communication interface, and a protocol type. An interface configuration module is configured to receive an indication of the selected one of the plurality of modes and program the programmable interface module to operate in the selected one of the plurality of modes in response to the indication.

12 Claims, 6 Drawing Sheets

EMBEDDED PROGRAMMABLE LOGIC FOR LOGIC STACKING ON APPLICATION PROCESSOR

CROSS-REFERENCE TO RELATED APPLICATIONS

This application claims the benefit of U.S. Provisional Application No. 61/434,303, filed on Jan. 19, 2011. The disclosure of the above application is incorporated herein by reference in its entirety.

FIELD

The present disclosure relates to application processors with multiple feature interfaces in a system on a chip.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An integrated circuit (IC) such as a system on a chip (SoC) may include components to implement a plurality of features (for example only, a plurality of interfaces and/or protocols). Accordingly, processing components of the SoC (e.g., an application processor and/or embedded microcontroller) may be configured to support the plurality of features.

Figure 1:
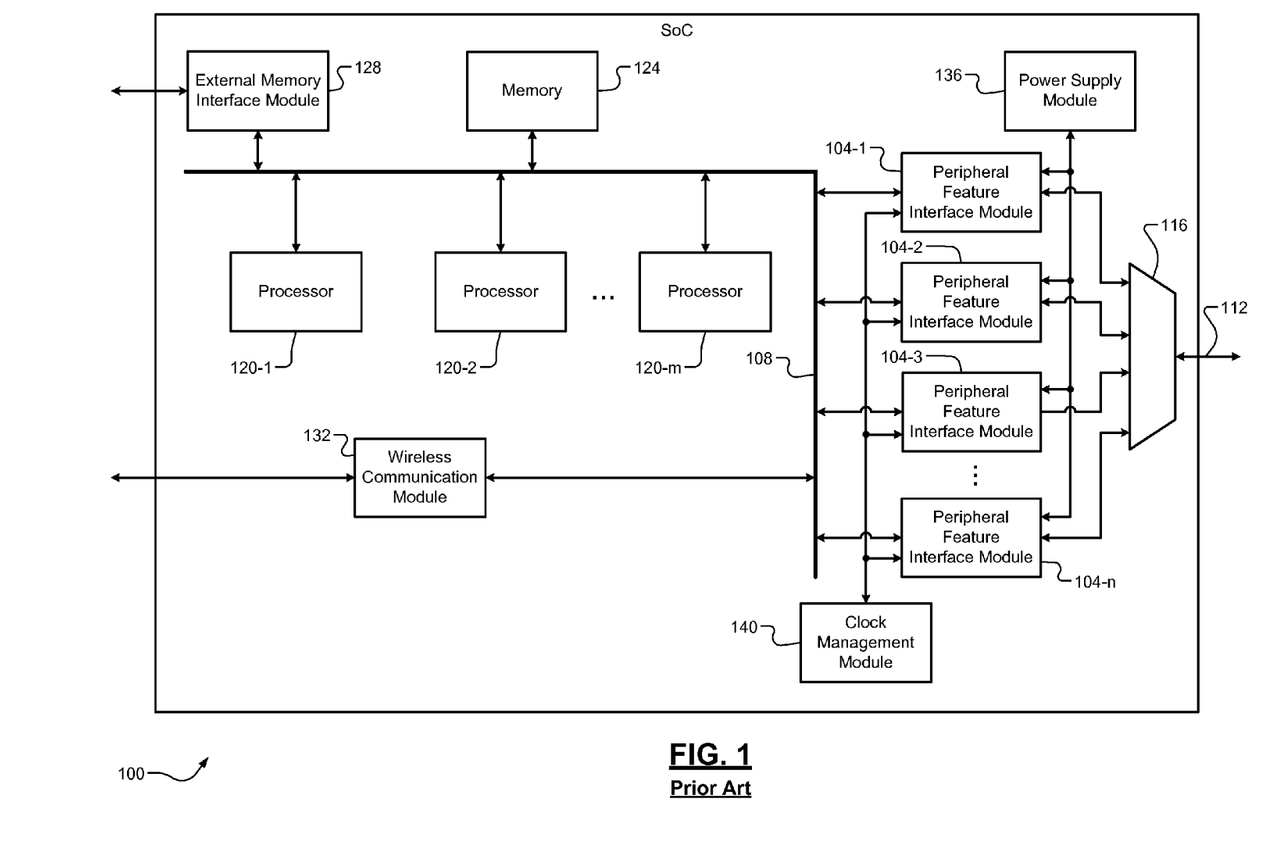
FIG. 1 is a system on a chip (SoC) including a plurality of peripheral feature interface modules according to the prior art.

Referring now to FIG. 1, an example SoC 100 includes a plurality of peripheral feature interface modules 104-1, 104-2, 104-3, . . . , 104-n, referred to collectively as peripheral feature interface modules 104. The interface modules 104 may implement a plurality of features including, but not limited to, a universal serial bus (USB) interface, a universal asynchronous receiver/transmitter (UART) interface, a security support provider (SSP) interface, a secure digital input output (SDIO) interface, an I²C interface, and/or a serial peripheral interface. The interface modules 104 may each implement a different one of the features, or two or more of the interface modules 104 may implement the same feature (e.g., a first SSP interface and a second SSP interface, respectively).

The interface modules 104 provide an interface between a system bus 108 of the SoC 100 and one or more external input/output (I/O) ports 112. For example only, the system bus 108 may be an advanced high-performance bus (AHB), an advanced eXtensible interface (AXI) bus, another advanced microcontroller bus architecture (AMBA) bus, or any customized processor bus architecture. Each of the interface modules 104 may communicate independently with an associated I/O port 112, or one or more of the interface modules 104 may share a single I/O port 112 via a multiplexer 116 or other selector as shown.

The SoC 100 includes one or more processors 120-1, 120-2, . . . , and 120-m, referred to collectively as processors 120. For example only, the processor 120-1 may be a main processor (e.g., an ARM processor) and the processor 120-2 may be a digital signal processor (DSP). The processors 120 communicate with each other, the interface modules 104, and memory 124 via the system bus 108. The memory 124 may correspond to a plurality of memory modules including, for example only, various types of both volatile and non-volatile memory. The SoC 100 may include an external memory interface module 128 for interfacing with external memory (not shown). The SoC 100 may also include a wireless communication module 132 that provides wireless communication features for the SoC 100.

The SoC 100 includes a power supply module 136 and a clock management module 140. The power supply module 136 manages and provides power distribution to each of the interface modules 104. Conversely, the clock management module 140 provides one or more clock signals to each of the interface modules 104. Although the power supply module 136 and the clock management module 140 are only shown providing respective signals to the interface modules 104, it is to be understood that the power supply module 136 and the clock management module 140 also provide power distribution and clock signals, respectively, to other components of the SoC 100.

Figure 2:
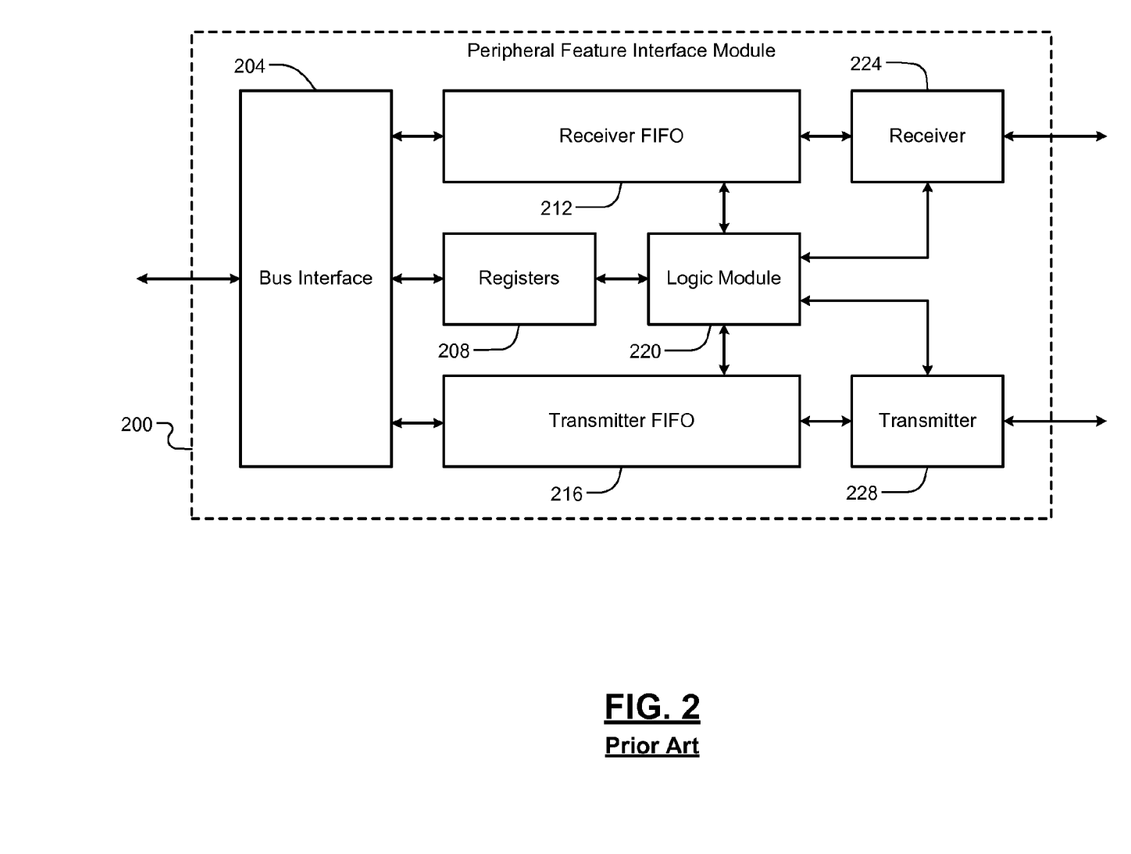
FIG. 2 is a peripheral feature interface module according to the prior art.

Referring now to FIG. 2, an example peripheral feature interface module 200 (e.g., that functions as a serial interface) communicates with the system bus 108 via a bus interface 204. The bus interface 204 provides an interface between the system bus 108 and registers 208 of the interface module 200 and/or a receiver first in first out (FIFO) buffer 212 and a transmitter FIFO buffer 216 of the interface module 200. For example only, the bus interface 204 may convert data received on the system bus 108 for data transactions with the transmitter FIFO buffer 216, and/or write operations on the registers 208. Conversely, the bus interface 204 may convert data received from the receiver FIFO buffer 212 and/or read from the registers 208 for data transactions on the system bus 108.

The interface module 200 includes a logic module 220 that implements control logic corresponding to the respective features of the interface module 200 (i.e., implements control logic corresponding to USB, UART, SSP, etc.). For example, the logic module 220 may include finite state machine (FSM) logic and/or glue logic. Accordingly, the logic module 220 communicates with the registers 208, the FIFO buffers 212 and 216, a receiver 224, and a transmitter 228 to provide specific functions associated with the corresponding interface module 200. For example, the FIFO buffers 212 and 216 provide data memory functions for the corresponding peripheral features. The receiver 224 and the transmitter 228 may convert parallel data of the FIFO buffers 212 and 216 to and from serial data of the I/O port 112. Each of the interface modules 104 as shown in FIG. 1 may implement each of the components of the interface module 200 as shown in FIG. 2.

SUMMARY

A system includes a programmable interface module located on an integrated circuit (IC), the programmable interface module configured to be programmed to operate in a plurality of modes, and communicate with at least one device external to the IC based on a selected one of the plurality of modes, wherein each of the plurality of modes corresponds to at least one of a type of peripheral feature, a type of communication interface, and a protocol type. An interface configuration module is configured to receive an indication of the selected one of the plurality of modes, and program the programmable interface module to operate in the selected one of the plurality of modes in response to the indication.

In other features, the IC includes a system on a chip (SOC). The programmable logic module includes a tile logic block (TLB) array.

A method includes providing a programmable interface module on an integrated circuit (IC), the programmable interface module configured to be programmed to operate in a plurality of modes, communicating with at least one device external to the IC based on a selected one of the plurality of modes, wherein each of the plurality of modes corresponds to at least one of a type of peripheral feature, a type of communication interface, and a protocol type, receiving an indication of the selected one of the plurality of modes, and programming the programmable interface module to operate in the selected one of the plurality of modes in response to the indication.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

An integrated circuit (IC) such as a system on a chip (SoC) may include a plurality of peripheral feature interface modules for implementing a plurality of features. For example, a manufacturer may configure the SoC to include additional hardware components (e.g., the plurality of peripheral feature interface modules) to support any possible features, interfaces, and protocols desired by various users of the SoC. Some of the features may not be used by certain users, but are still supported by the SoC. The additional hardware components increase the required silicon area associated with the SoC. Accordingly, size and cost of the SoC also increases. Further, each additional hardware component may increase power consumption, chip leakage, required clock and power supply signals, signal routes, output multiplexers, and/or other structural features of the SoC.

In an SoC according to the principles of the present disclosure, a programmable peripheral feature interface module is configured to operate in a plurality of feature modes, each mode supporting one of a plurality of different features. For example, a single programmable interface module may be configured to support a plurality of possible desired features, interfaces, and protocols, and may be configured to operate in a plurality of different communication modes (e.g., a programmed input/output mode, a direct memory access mode, and/or a network mode). For example only, the programmable interface module may include embedded programmable logic.

The programmable logic may be configured to operate according to the desired features. For example, the SoC may include a plurality of the programmable interface modules, each including programmable logic configurable to operate according to any of the desired features. A first one of the programmable interface modules may be configured to support a first feature, and may configure a second one of the programmable interface modules to support a second feature. Or, the programmable interface modules may be configured to support the same feature. A first one of the programmable interface modules may be configurable to support one of a first set of features while a second one of the programmable interface modules may be configurable to support one of a second set of features that are different than the first set of features.

Figure 3:
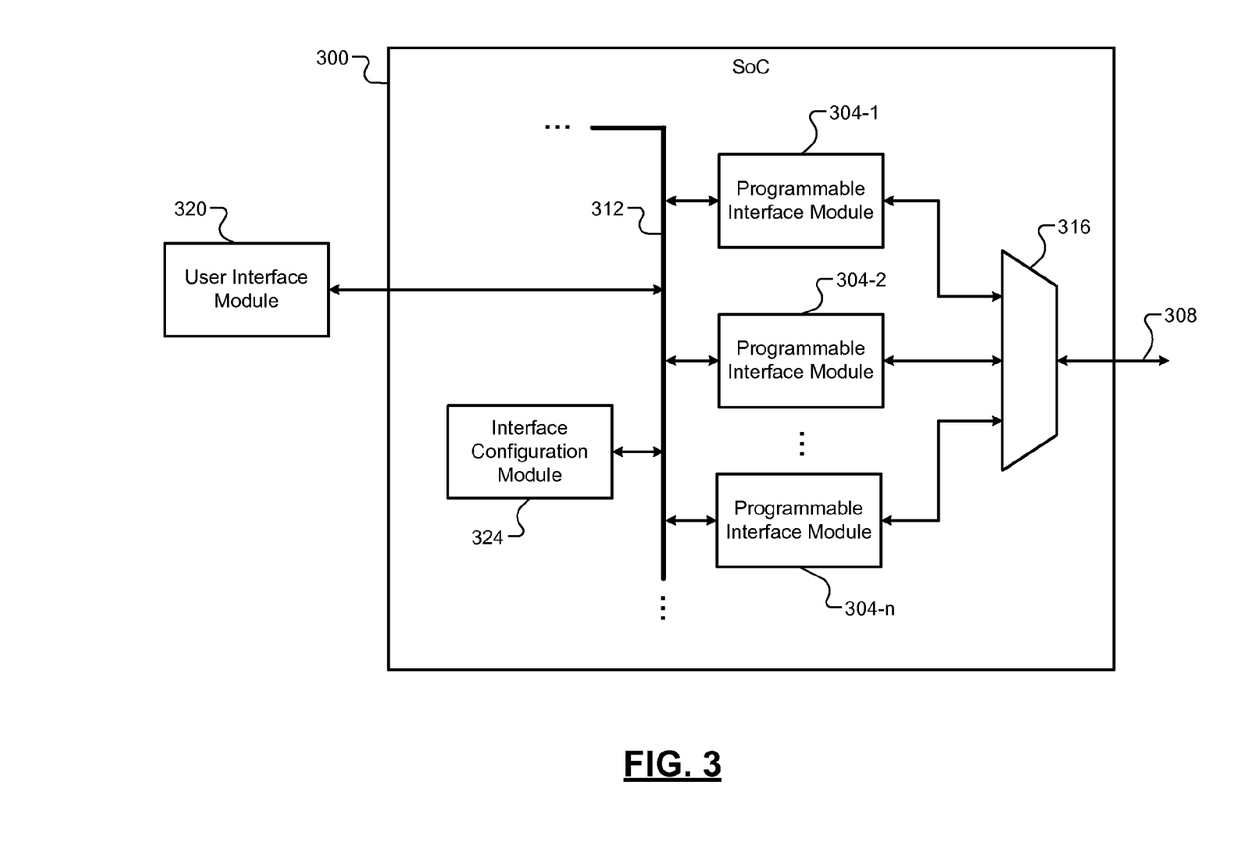
FIG. 3 is a system on a chip including a programmable peripheral feature interface module according to the principles of the present disclosure.

Referring now to FIG. 3, an IC such as an SoC 300 includes one or more programmable peripheral feature interface modules 304 (e.g., programmable interface modules 304-1, 304-2, . . . , and 304-n, referred to collectively as programmable interface modules 304) that may be selectively programmed to support one of a plurality of peripheral features. For example, the programmable interface module 304-1 may be configured to operate in a first mode to support a first peripheral feature and may configure the programmable interface module 304-2 to operate in a second mode to support a second peripheral feature. The first peripheral feature and the second peripheral feature may correspond to the same function or to different functions. The programmable interface modules 304 provide an interface between one or more input/output (I/O) ports 308 and other components (not shown) of the SoC 300 via a system bus 312. The programmable interfaces 304 may communicate with respective associated I/O ports, or may communicate with the I/O port 308 via a multiplexer 316.

Further, each of the programmable interface modules 304 may be configurable to support different sets of peripheral features. For example, one of the programmable interface modules 304 may be configurable to operate in a first set of modes to support various serial interface features, whole another one of the programmable interface modules 304 may be configurable to operate in a second set of modes to support various graphics processing features (such as a graphics engine), an encryption engine, or any other dedicated process engine. In this manner, a given one of the programmable interface modules 304 may include components that are commonly used for functions in the same set of peripheral features. For example, if the programmable interface module 304-1 is configurable to support serial interface features, the programmable interface module 304-1 may include various components that are common between a plurality of types of serial interfaces. Conversely, the programmable interface module 304-2 may include various components that are common between a plurality of types of graphics processing.

In some implementations, the SoC 300 may include and/or communicate with a user interface module 320. The user interface module 320 allows the user to select desired configurations of each of the programmable interface modules 304. For example, if the programmable interface module 304-1 is configured to operate in modes supporting serial interface features, the user may use the user interface module 320 to configure the programmable interface module 304-1 to operate as a particular type of serial interface. Selecting the desired configuration may include modifying a programmable hardware and/or software portion of the programmable interface module 304-1. For example only, the user interface module 320 may include one or more switches and/or buttons associated with respective ones of the programmable interface modules 304.

In some implementations, the SoC 300 may include an interface configuration module 324 that programs the programmable interface modules 304 in response to the user interface module 320. Or, the interface configuration module 324 may be external to the SoC 300 (e.g., the user interface module 320 may include interface configuration module). For example, when the user selects a desired configuration for one of the programmable interface modules 304 using the user interface module 320, the user interface module 320 generates an indication of the selection (e.g., instructions to change the configuration of the one of the programmable interface modules). The interface configuration module 324 receives the instructions from the user interface module 320 to select a desired feature, and programs a corresponding one of the programmable interface modules 304 to operate in a mode according to the desired feature.

Figure 4:
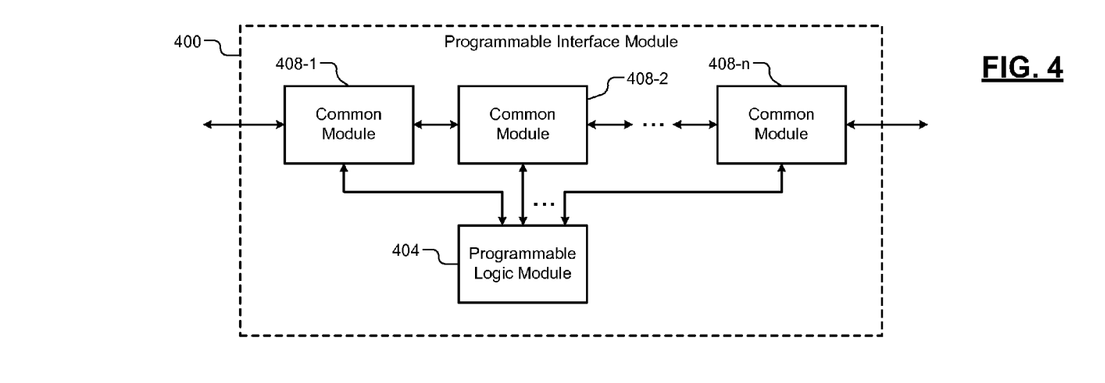
FIG. 4 is a programmable peripheral feature interface module according to the principles of the present disclosure.

Referring now to FIG. 4, an example programmable peripheral feature interface module 400 (i.e., a programmable interface module) includes a programmable logic module 404 configured to operate in a plurality of modes and one or more common modules 408-1, 408-2, . . . , 408-n, referred to collectively as common modules 408. For example only, the common modules 408 may include one or more hardware components (e.g., data path logic) that are commonly used for each of the functions in the same set of peripheral features. Conversely, the user may selectively configure (e.g., program) the programmable logic module 404 according to a desired feature of the set of peripheral features. In other words, regardless of how the programmable logic module 404 is configured (e.g., which mode the programmable logic module 404 is operating in), each of the respective features of the programmable interface module 400 may use the same common modules 408. Accordingly, additional common modules 408 are not required to provide the functions of a plurality of respective features associated with the same set of peripheral features.

Figure 5:
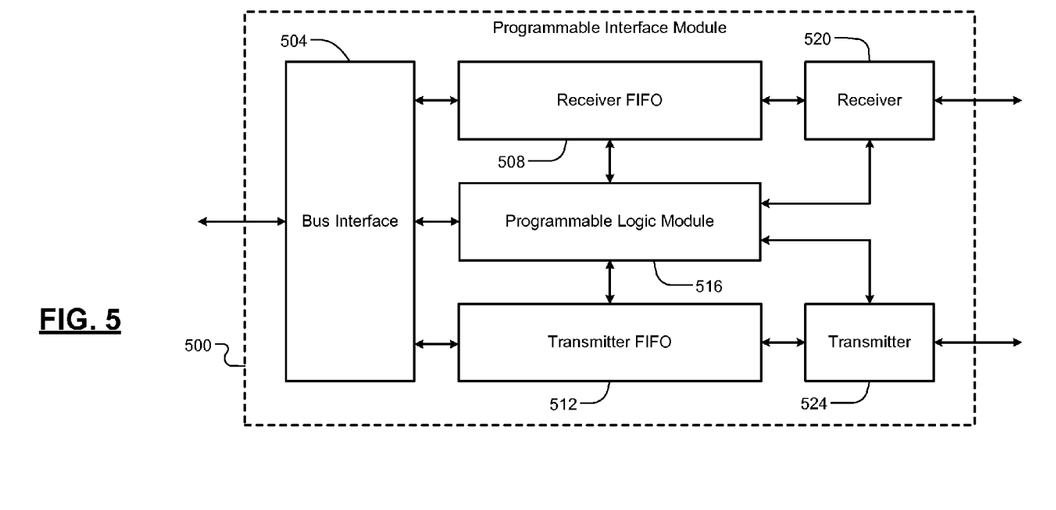
FIG. 5 is a programmable peripheral feature interface module that functions as a serial interface according to the principles of the present disclosure.

Referring now to FIG. 5, an example programmable peripheral feature interface module 500 (e.g., that functions as a serial interface) communicates with the system bus 312 via a bus interface 504. The bus interface 504 provides an interface between the system bus 312 and a receiver first in first out (FIFO) buffer 508 and a transmitter FIFO buffer 512 of the programmable interface module 500. For example only, the bus interface 504 may convert data received on the system bus 312 for data transactions with the transmitter FIFO buffer 512. Conversely, the bus interface 504 may convert data received from the receiver FIFO buffer 508 for data transactions on the system bus 312.

The programmable interface module 500 includes a programmable logic module 516 that implements control logic corresponding to any desired one of a plurality of features of the programmable interface module 500. For example, the programmable logic module 516 may be selectively configured by a user to implement control logic corresponding to any one of a plurality of serial interface types (e.g., USB, UART, SSP, etc.). In other words, the programmable logic module 516 includes structure for implementing any one of the plurality of serial interface types in different respective modes and can be configured as desired by the user.

Accordingly, the programmable logic module 516 communicates with the FIFO buffers 508 and 512, a receiver 520, and a transmitter 524 to provide functions associated with any one of the plurality features, and the remaining components of the programmable interface module 500 may provide the same functions regardless of how the programmable logic module 516 is configured. For example, the FIFO buffers 508 and 512 provide data memory functions for whichever peripheral feature is selected for the programmable logic module 516. Accordingly, a single one of the programmable interface modules 500 can be used to provide support for a plurality of different features.

While the configuration of the programmable logic module 516 is described as being selected by the user, other suitable structures and methods for selecting the configuration of the programmable logic module 516 are anticipated. For example, the programmable logic module 516 may automatically switch between configurations based on a timing scheme such as time division multiplexing. For example only, the programmable logic module 516 may be configured to support $I^2C$ features in a first time period, SPI features in a second time period, $I^2S$ features in a third period, and CAN features in a fourth time period. The programmable interface module 500 may also be configured to automatically detect which types of features are desired by the user (e.g., based on physical connections of the SoC and/or host device) and configure the programmable logic module 516 accordingly.

Figure 6:
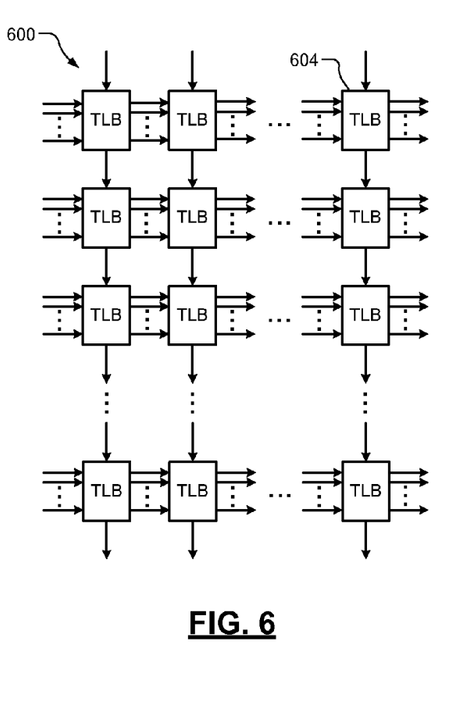
FIG. 6 is a tile logic block array of a programmable peripheral feature interface module according to the principles of the present disclosure.

Referring now to FIG. 6, the programmable logic module 516 may include a tile logic block (TLB) array 600. The TLB array 600 may include any suitable number and arrangement of TLBs 604. For example only, the TLB array 600 may include a 16×8 array of the TLBs 604.

Figure 7:
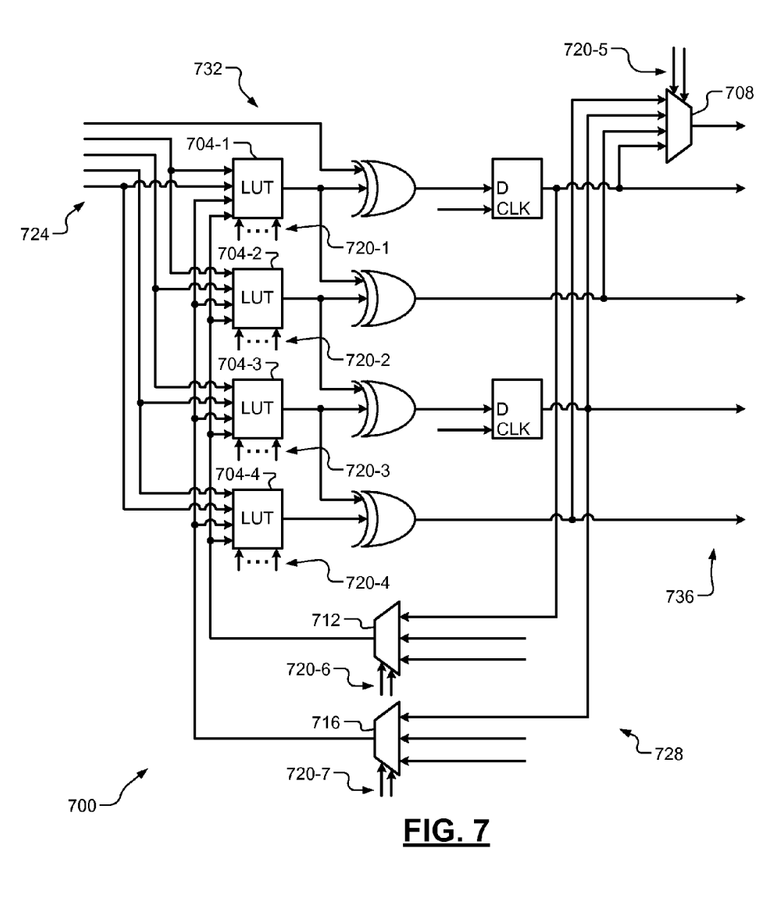
FIG. 7 is a tile logic block according to the principles of the present disclosure.

Referring now to FIG. 7, an example TLB 700 includes programmable logic such as look up tables (LUTs) 704-1, 704-2, 704-3, and 704-4, referred to collectively as LUTs 704, and programmable multiplexers 708, 712, and 716. Although as shown the TLB 700 includes four of the LUTs 704, any suitable number of the LUTs 704 may be used. The LUTs 704 and the multiplexers 708, 712, and 716 are programmed according to programming inputs 720-1, 720-2, 720-3, 720-4, 720-5, 720-6, and 720-7, referred to collectively as programming inputs 720. The programming inputs 720 communicate programmable control bits to the LUTs 704 and the multiplexers 708, 712, and 716. The programming inputs 720 are provided based on a desired configuration selected by the user (e.g., as selected at a user interface). For example only, the programming inputs 720 may include a 54 bit stream of programmable control bits, where each of the LUTs 704 receives 12 bits and each of the multiplexers 708, 712, and 716 receives 2 bits.

Accordingly, for a given set of inputs (e.g., inputs 724 to the LUTs 704, inputs 728 to the multiplexers 712 and 716, and an input 732), the TLB 700 generates outputs 736 according to a current programmed configuration of the LUTs 704 and the multiplexers 708, 712, and 716. For example, the inputs correspond to data received by the programmable logic module 516 (as shown in FIG. 5) and/or inputs received by the TLB 700 from another TLB in the TLB array 600 (as shown in FIG. 6). In this manner, ultimately the output of the TLB array 600 in response to any data received is based on the selected configuration of the programmable logic module 516. For example, if the user selects an SSP configuration, the LUTs 704 are programmed accordingly, and the output of the TLB array 600 in response to any data received corresponds to the SSP configuration. Conversely, if the user selects a UART configuration, the LUTs 704 are programmed accordingly, and the output of the TLB array 600 in response to any data received corresponds to the UART configuration.

Figure 8:
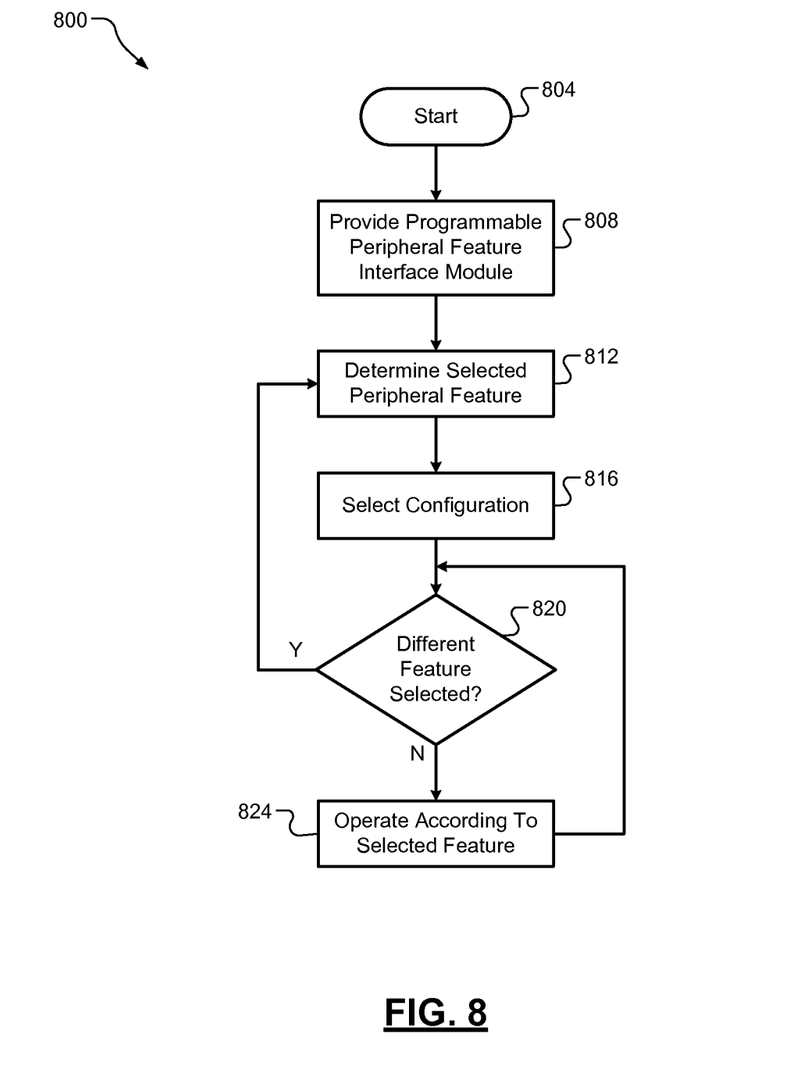
FIG. 8 illustrates a programmable peripheral feature interface method according to the principles of the present disclosure.

Referring now to FIG. 8, a programmable peripheral feature method 800 begins at 804. At 808, the method 800 provides an IC such as an SoC with a programmable peripheral feature interface module configured to support a plurality of different peripheral features. At 812, the method 800 determines which peripheral feature is selected. At 816, the method 800 selects a configuration based on the selected peripheral feature and programs the programmable interface module accordingly. At 820, the method 800 determines whether a different peripheral feature is selected. If true, the method 800 continues to 812. If false, the method 800 continues to 824. At 824, the method 800 operates according to the selected peripheral feature.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system, comprising:
an integrated circuit comprising
a data bus, and
a programmable interface module configured to be programmed to operate in a plurality of different modes, wherein the programmable interface module is configured to, based on a selected one of the plurality of different modes, provide communication between the data bus of the integrated circuit and a device external to the integrated circuit, wherein each of the plurality of different modes corresponds to a different type of a serial communication interface relative to that corresponding to other ones of the plurality of different modes, and wherein the different types of the serial communication interface include two or more of a universal serial bus interface, a universal asynchronous receiver/transmitter interface, a security support provider interface, a secure digital input output interface, an I$^2$C interface, and a serial peripheral interface; and an interface configuration module configured to receive an indication of the selected one of the plurality of different modes, and program the programmable interface module to operate in the selected one of the plurality of different modes in response to the indication, wherein the interface configuration module is configured to receive the indication from a user interface module, and wherein the user interface module is configured to receive, from a user, a desired one of the plurality of different modes corresponding to the selected one of the plurality of different modes.

2. The system of claim 1, wherein the integrated circuit comprises a system on a chip.

3. The system of claim 1, wherein the user interface module is external to the integrated circuit.

4. The system of claim 1, wherein the programmable interface module includes:
   a programmable logic module configured to operate in the one of the plurality of different modes, wherein the interface configuration module is configured to program the programmable logic module in response to the indication; and
   at least one common module configured to operate in one of the plurality of different modes, wherein the common module is common to the plurality of different modes, and wherein the interface configuration module does not program the at least one common module.

5. The system of claim 4, wherein the programmable logic module includes a tile logic block (TLB) array.

6. The system of claim 1, wherein the programmable interface module is a first programmable interface module, wherein the plurality of different modes correspond to a first plurality of different modes, and wherein the system further comprises a second programmable interface module configured to operate in one of the first plurality of different modes or one of a second plurality of different modes, wherein each of the second plurality of different modes is different than each of the first plurality of different modes.

7. A method for providing communication between a data bus of an integrated circuit and a device external to the integrated circuit via a programmable interface module, wherein the integrated circuit comprises programmable interface module configured to be programmed to operate in a plurality of different modes, the method comprising:
   providing communication between a data bus of the integrated circuit and at least one device external to the integrated circuit based on a selected one of the plurality of modes, wherein each of the plurality of modes corresponds to a different type of a serial communication interface relative to that corresponding to other ones of the plurality of different modes, and wherein the different types of the serial communication interface include two or more of a universal serial bus interface, a universal asynchronous receiver/transmitter interface, a security support provider interface, a secure digital input output interface, an I$^2$C interface, and a serial peripheral interface;

receiving, from a user, a desired one of the plurality of different modes corresponding to the selected one of the plurality of different modes, providing, from a user interface module, an indication of the selected one of the plurality of different modes in response to the desired one of the plurality of different modes being received from the user, receiving the indication of the selected one of the plurality of different modes; and programming the programmable interface module to operate in the selected one of the plurality of different modes in response to the indication.

8. The method of claim 7, wherein the integrated circuit includes a system on a chip.

9. The method of claim 7, wherein the user interface module is external to the integrated circuit.

10. The method of claim 7, further comprising:
operating a programmable logic module in the one of the plurality of different modes;
programming the programmable logic module in response to the indication; and
operating at least one common module configured in the plurality of modes, wherein the common module is common to the plurality of different modes.

11. The method of claim 10, wherein the programmable logic module includes a tile logic block (TLB) array.

12. The method of claim 7, wherein the programmable interface module is a first programmable interface module and the plurality of different modes corresponds to a first plurality of different modes, and further comprising:
providing a second programmable interface module configured to operate in one of the first plurality of different modes or one of a second plurality of different modes, wherein each of the second plurality of different modes is different than each of the first plurality of different modes.

* * * * *